United States Patent
Ligman et al.

(10) Patent No.: US 9,459,990 B2
(45) Date of Patent: Oct. 4, 2016

(54) AUTOMATIC AND TRANSPARENT APPLICATION LOGGING

(75) Inventors: Joseph W. Ligman, Wilton, CT (US); Marco Pistoia, Amawalk, NY (US); John J. Ponzo, Hawthorne, NY (US); Umut Topkara, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 13/431,422

(22) Filed: Mar. 27, 2012

(65) Prior Publication Data

US 2013/0262617 A1 Oct. 3, 2013

(51) Int. Cl.
*G06F 11/36* (2006.01)
*G06F 11/34* (2006.01)

(52) U.S. Cl.
CPC ....... *G06F 11/3644* (2013.01); *G06F 11/3466* (2013.01); *G06F 11/3476* (2013.01); *G06F 2201/865* (2013.01)

(58) Field of Classification Search
CPC ...... G06F 17/30; G06F 9/44; G06F 11/3466; G06F 11/3476; G06F 11/3644; G06F 2201/865
USPC .................................. 709/217–218
See application file for complete search history.

(56) References Cited

U.S. PATENT DOCUMENTS

| | | | |
|---|---|---|---|
| 6,606,660 B1 * | 8/2003 | Bowman-Amuah | 709/227 |
| 6,859,834 B1 * | 2/2005 | Arora et al. | 709/227 |
| 6,868,526 B2 | 3/2005 | Singh | |
| 7,496,575 B2 * | 2/2009 | Buccella et al. | |
| 7,743,029 B2 | 6/2010 | Frey et al. | |
| 7,809,802 B2 * | 10/2010 | Lerman et al. | 709/217 |
| 7,856,496 B2 * | 12/2010 | Kline | 709/223 |
| 8,245,200 B2 * | 8/2012 | Baierl et al. | 717/130 |
| 2003/0163562 A1 | 8/2003 | Ford et al. | |
| 2004/0250259 A1 * | 12/2004 | Lauterbach et al. | 719/315 |
| 2005/0028171 A1 * | 2/2005 | Kougiouris | G06F 11/0781 719/318 |
| 2005/0229186 A1 * | 10/2005 | Mitchell et al. | 719/315 |

(Continued)

FOREIGN PATENT DOCUMENTS

EP 1004069 B1 * 12/2008
WO WO 99/24904 A1 5/1999

OTHER PUBLICATIONS

Ahmed et al.; "An Automated User Transparent Approach To Log Web URLs For Forensic Analysis", IMF Fifth International Conference on, Sep. 15-17, 2009, pp. 120-127.

Pellegrini et al.; "Di-DymeLor: Logging Only Dirty Chunks For Efficient Management of Dynamic Memory . . . Simulation Objects", 23rd Workshop on, Jun. 22-25, 2009, pp. 45-53.

(Continued)

*Primary Examiner* — Joe Chacko
(74) *Attorney, Agent, or Firm* — Scully, Scott, Murphy & Presser, P.C.; Daniel P. Morris, Esq.

(57) ABSTRACT

Automatic application logging, in one aspect, may receive a directive for logging data associated with an application. One or more runtime objects of an instance of the application running on a processor may be modified according to the directive to collect the data. The data may be collected via the modified one or more runtime objects.

25 Claims, 9 Drawing Sheets

(56) References Cited

U.S. PATENT DOCUMENTS

| | | |
|---|---|---|
| 2007/0083928 A1* | 4/2007 | Mattsson et al. ............... 726/22 |
| 2007/0250618 A1 | 10/2007 | Hammond |
| 2007/0299631 A1 | 12/2007 | Macbeth et al. |
| 2008/0275951 A1 | 11/2008 | Hind et al. |
| 2008/0313228 A1 | 12/2008 | Clark et al. |
| 2009/0013163 A1 | 1/2009 | Cheng et al. |
| 2009/0157628 A1* | 6/2009 | Arthursson et al. ............... 707/3 |
| 2009/0187523 A1* | 7/2009 | D'Alo et al. ................... 706/47 |
| 2010/0125477 A1* | 5/2010 | Mousseau et al. ............... 705/7 |
| 2011/0276951 A1* | 11/2011 | Jain .................... G06F 11/3006 717/140 |

OTHER PUBLICATIONS

IBM et al.; "Transparent Logging of OAM Activities for NEs Integrated Using IT Protocols", IPCOM000170034D, Jun. 3, 2008.

IBM et al.; "Common Logging Framework", IPCOM000129263D, Oct. 4, 2005.

Ji et al., Cost-sensitive feature acquisition and classification, Pattern Recogn. 40, 5 (May 2007), 1474-1485. http://dx.doi.org/10.1016/j.patcog.2006.11.008.

Li et al., ACE-Cost: acquisition cost efficient classifier by hybrid decision tree with local SVM leaves, (MLDM'11), 2011 Petra Perner (Ed.). Springer-Verlag, Berlin, 60-74.

* cited by examiner

AUTOMATIC AND TRANSPARENT APPLICATION LOGGING

FIELD

The present application relates generally to computers, and computer applications, and more particularly to automatic and transparent application logging.

BACKGROUND

Application logs are a major source of information for large-scale analytics. In web applications, where the behaviors of the applications are observable from the web servers through application programming interface (API) calls, the web server logs are used to perform analytics. Since the web servers reside on the service provider side, the service providers can easily change the data to be logged as well as the granularity of logging as needs arise. For instance, in response to a customer complaint, the developers can increase the detail of the logs for a particular API call, to figure out the source of the complaint, or they can choose to monitor certain clients' activity more closely.

The application behavior is not readily observable for mobile and desktop applications. Many mobile and desktop applications are standalone executables with local storage and presentation. Most of the applications that use network connectivity only use the network for a subset of the activities. Logging mechanisms are used to create logs for tracing the lifetime of the application. Usually this involves adding log statements to the application code, which instructs the logging mechanism to store and/or forward the logged data to a server. These sprinkled log statements clutter the application source code. It also becomes a challenge to maintain consistency of the log format across different developers working on the application. Moreover, since the log statements are compiled into the application flow, they incur a performance penalty, and spurious log data will inflate the communication load with the analytics server. Replacing all the installed application instances with a new version of the application that has different log granularities is just not a practical approach, especially for mobile devices.

BRIEF SUMMARY

A method of automatic application logging, in one aspect, may include receiving a directive for logging data associated with an application. The method may also include modifying one or more runtime objects of an instance of the application running on a processor according to the directive to collect the data. The method may further include collecting the data via the modified one or more runtime objects.

A system for automatic application logging, in one aspect, may include a logger operable to execute on a processor and to receive a directive for logging data associated with an application. The logger may be further operable to modify one or more runtime objects of an instance of the application running on the processor according to the directive to collect the data. The logger may be further operable to collect the data via the modified one or more runtime objects.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
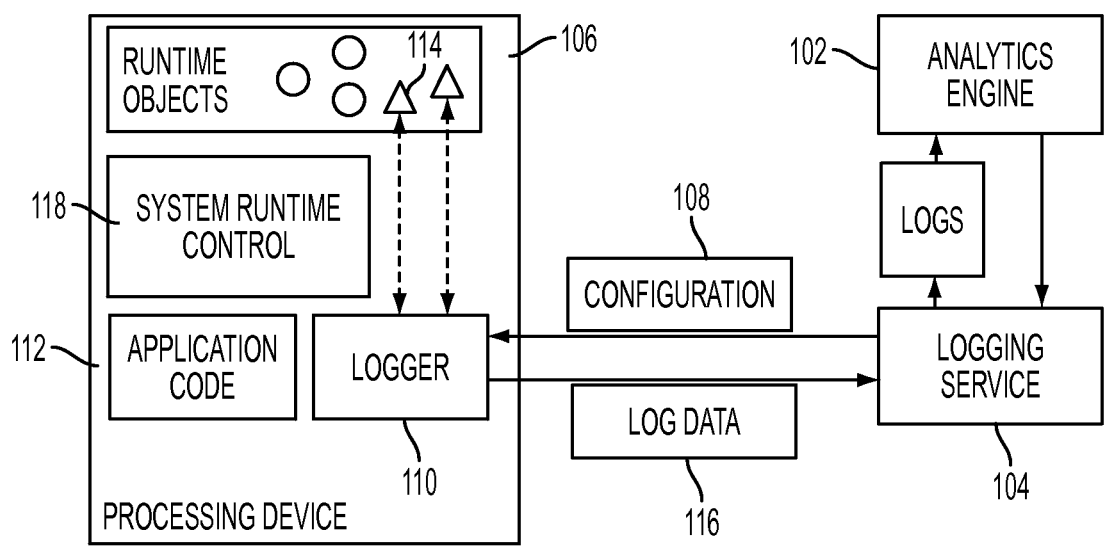
FIG. 1 shows general architecture of the system in one embodiment of the present disclosure.

One or more systems and methods may be provided that may adaptively change the logging behavior of installed applications in response to requests from one or more analytics and service providers. The adaptive analytics data from the logs can then be used to adjust the presentation of the application to the user, or the overall application behavior, which, for example, could improve the user experience, security, application performance and safety.

An embodiment of the present disclosure describes a logging method and a corresponding logging system complete with a storage and control backend, which is geared towards analytics. A logging method in one embodiment of the present disclosure uses a runtime instrumentation, which includes modifying the memory for object instances as well as changing runtime method bindings. Each installed application instance is flexibly configurable at runtime from the remote analytics service. An analytics server can specify the identity or type of the device sensors, operating system services, application variables, objects, methods and callbacks that are logged as well as the granularity they are to be logged. The log data is sent for analysis to the analytics server at a frequency as configured. The analytics server can then communicate with the runtime instrumentation to adjust the behavior of the application to improve the application performance, usability, security, or safety, or combinations thereof.

In one embodiment of the present disclosure, application behavior is captured with a runtime logging method and a corresponding logging system, all of which can be adaptively and dynamically controlled and used in conjunction with an analytics engine.

The logging method in one embodiment of the present disclosure employs a runtime instrumentation which is able to modify the memory for objects as well as runtime method bindings. A logging server can flexibly control logging behavior of the installed instances of the application, and change the logging configuration of all of, or a subset of the instances as needed. A logging mechanism that ships with the application is able to log the activity associated with device sensors, operating system services, application objects, methods, and callbacks. The logging mechanism is able to adjust the granularity of the logged data in response to directives from the logging server, and can send the resulting log data for further analysis to the server, which may be a remote server, at a frequency as configured by the logging server.

The capabilities of the methods and systems of the present disclosure may provide advantages such as the ability to avoid having to add log statements in source codes; Individual object instances can be enabled for logging member functions and callbacks, hence performance of instances that are not logged is not affected; Backend components can enable logging even after the compiled binary is distributed; What is logged may include application context, objects involved and input, and may be dynamically configurable; Code from third party libraries can be logged as well. Individual instances of the application can be turned on and off for logging; The application does not need to be restarted or re-installed to change logging configuration; The part of the logs that are sent back to a server may be specified in the configuration given by the analytics service, and may depend on measurable quantities such as the quality of network, power level of the device, and cost of network; Application state can be re-animated by running the application and feeding the sensor and input callbacks in the client logs in chronological order.

In one aspect, a logging mechanism of the present disclosure in one embodiment may be geared toward the flexibility needs of an analytics engine that will analyze the application use over a large number of application instances in order to report and/or adjust the application behavior to improve usability, conformance, security, and performance. The analytics engine for application logs may adaptively and cost-consciously decide to get a higher granularity data feed from parts of the application or a subset of the instances in order to make decisions, instead of getting all the possible data from all the applications at the cost of reducing the application responsiveness and increasing the server load. In machine learning literature, the costs associated with gleaning input data for learning algorithms, such as running-time, battery use, network load, etc. are called feature acquisition cost, and there are many learning algorithms which can adapt to strike a balance to minimize this cost while maximizing the accuracy of decisions. The logging mechanism of the present disclosure in one embodiment allows an analytics server or engine to take advantage of such cost-aware acquisition, for instance, by providing the following flexibility features: control from a remote server; switch logging on and off for a component during runtime; send the logging data back to server at configurable intervals; change the detail of data logged about a component at runtime; incur minimal or no cost on components that are not logged; log all incoming data to the application including user interaction and system services as needed.

FIG. 1 shows general architecture of the system in one embodiment of the present disclosure. As an example, the application 112 to be logged may be on a processing device and the logger component 110 communicates with a logging service 104 over a network, remotely for example. The processing device may be any type of a device that may include a processor and memory, capable of executing application programs or the like, and for example, may include networking capabilities for communications. Examples of the processing device may include, but are not limited to, a mobile device such as a smartphone, a cellular phone, a tablet device, a laptop, or the like, a desktop computer or the like. An analytics engine 102 interacts with the logging service 104 to instruct an individual instance 106 of an application 112 to operate with a particular configuration. The configuration 108 is sent to the logger 110 on the application by the logging service 104. The logger 110 modifies the runtime objects 114 corresponding to the configuration 108 and starts collecting logs of activities from these objects at the granularity instructed by the configuration 108. The parts of the program 112 that are not being logged operate without disruption. The logger 110 may send new data 116 to the logging service 104 at the interval specified by the configuration 108.

In one embodiment of the present disclosure, a loggable component library is provided for instrumentation that interacts with the system runtime control 118 to capture the instantiations of the objects 106 and replace the objects with another object (e.g., 114) from the loggable component library, which can behave like the original object but also can interact with the logger 110 and send log data to the logger 110 at a requested granularity. In one aspect, the communication between the logger 110 and the logging server 104 may be flexible to accommodate intermittent communication, offline mode, as well as low-bandwidth.

A runtime instrumentation methodology of the present disclosure enables the logging activity to be initiated and configured with directives 108 coming from the logging service or server 104 at runtime. The directives can be optionally saved to a configuration file for offline operations locally with the application 112. The contents of the configuration directives may include granularity levels for logging and also specification of the side-data such as application context to be logged, as well as which specific events and callbacks involving which application objects and/or sensors are to be collected.

Yet in another aspect, the runtime instrumentation of the present disclosure may allow to selectively enable interception of function calls on specific classes. For example, consider that the configuration requests only the onClick( ) call of Button class on an instance named ButtonA to be logged, and there is also an instance of Button named ButtonB for which logging is not requested. The onClick( ) calls on ButtonB will not be intercepted in the runtime instrumentation of the present disclosure in one embodiment, hence the application flow will not be disrupted. The runtime instrumentation of the present disclosure thus may make it possible to log heavily used functions without a large processing cost, because it is able to focus on single object instances of classes. The logging may be embedded into a running application instance, and may log various activities of that running instance, e.g., enable logging on individual object instances.

Figure 2:
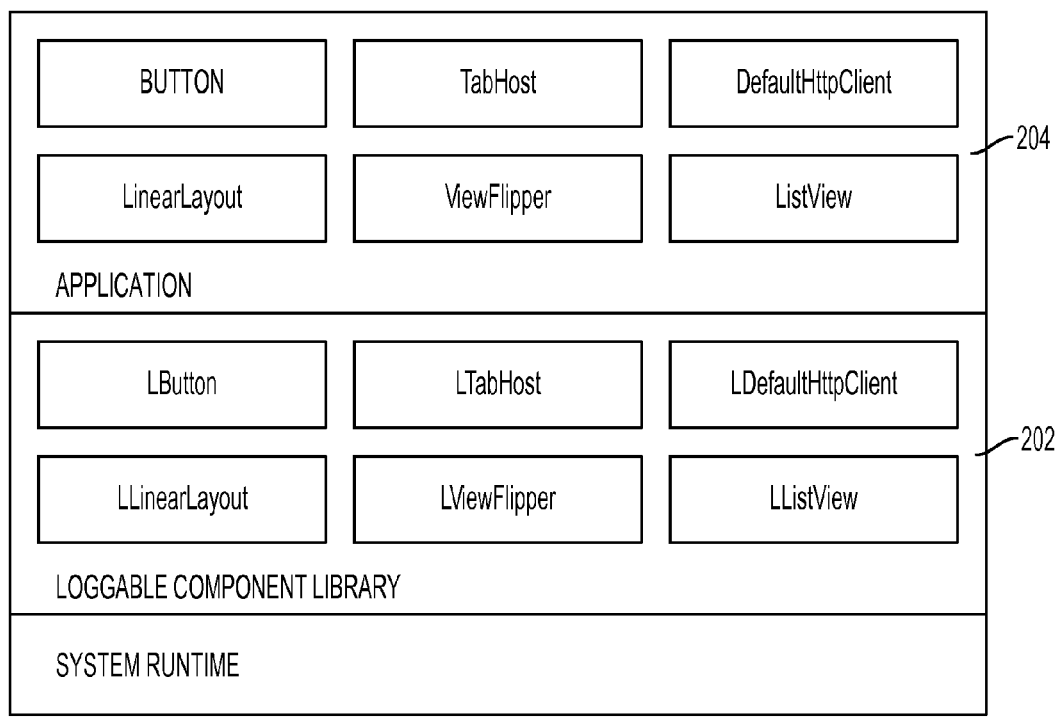
FIG. 2 illustrates an example of the relationship between the loggable component library of the present disclosure and an application in one embodiment of the present disclosure.

FIG. 2 illustrates an example of the relationship between the loggable component library 202 of the present disclosure and an application 204 in one embodiment of the present disclosure. The figure shows how each component in the Application 204 is "overridden" by the loggable component library 202. The loggable component library in one embodiment of the present disclosure may be activated by overriding the class loader or the like.

In one embodiment of the present disclosure, the loggable component library implementation may be bundled with the rest of the application at the build stage. The logger runtime may be loaded when the application loads with an initialization statement. At that point, none of the loggable components are loaded yet. The logger runtime may check the configuration that may be locally stored or downloaded from a server. According to the configuration, the application runtime may be modified to instantiate loggable components instead of normal components.

Figure 3:
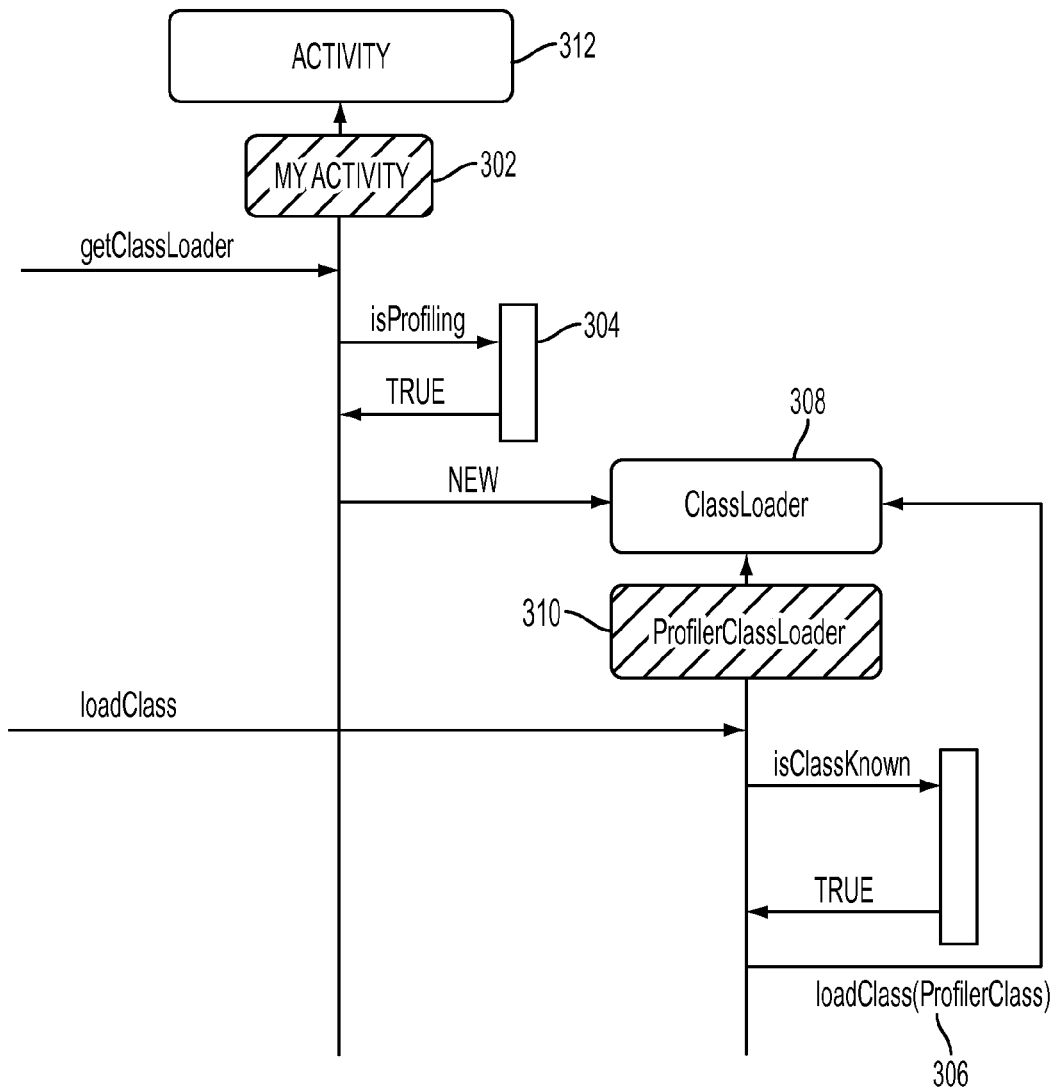
FIG. 3 illustrates activating the loggable component library in one embodiment of the present disclosure.

FIG. 3 illustrates activating the loggable component library in one embodiment of the present disclosure. In one aspect, initialization is achieved by overriding the class loader or the like for any given activity 302. If the developer chooses to enable profiling as shown at 304, the profiling components are loaded in place of the default components as shown at 306. The profiling components perform the functions of the original components and also perform the specified logging functionalities. In one embodiment of the present disclosure, the implementation of loggable components may be already added into the application binary at the build time when the executable is packaged to be sent to the users, along with original versions of those components.

If a system runtime uses a classloader 308 to instantiate an object, the logger of the present disclosure in one embodiment creates a special classloader 310, which will create loggable objects instead of normal objects as instructed by the logging configuration. The profiler classloader 310 may be implemented as a subclass of the classloader 308. Activity 312 represents a unit of user interaction. Activity 312 may be considered as a controller class, or an application class itself. MyActivity 302 is an instance of class activity, or the application. Activity 312 is a unit entry point where new objects are instantiated. In one embodiment of the present disclosure it is a place where the hooks are placed for instantiating logging component objects instead of default components.

Consider, for example, Activity 312 as the main application class. Inside the main, there may be a line call to the logging library to load itself. Before passing the control back to the main, the logging library may check if the configuration file directs for logging, for example, by invoking isProfiling call shown at 304. If logging is directed, it loads a custom classloader or the like, for example, profilerClassLoader 310 instead of a plain instance of the default classLoader 308 or the like. A classloader is Java™-specific, and handles a request to the runtime system to instantiate a class. Other such one or more functionalities may be utilized in other implementations. For example, in other languages like objective-C, other runtime libraries to achieve the same effect may be utilized. Thus, the methodologies of the present disclosure are not limited to Java™-specific implementations.

Figure 4:
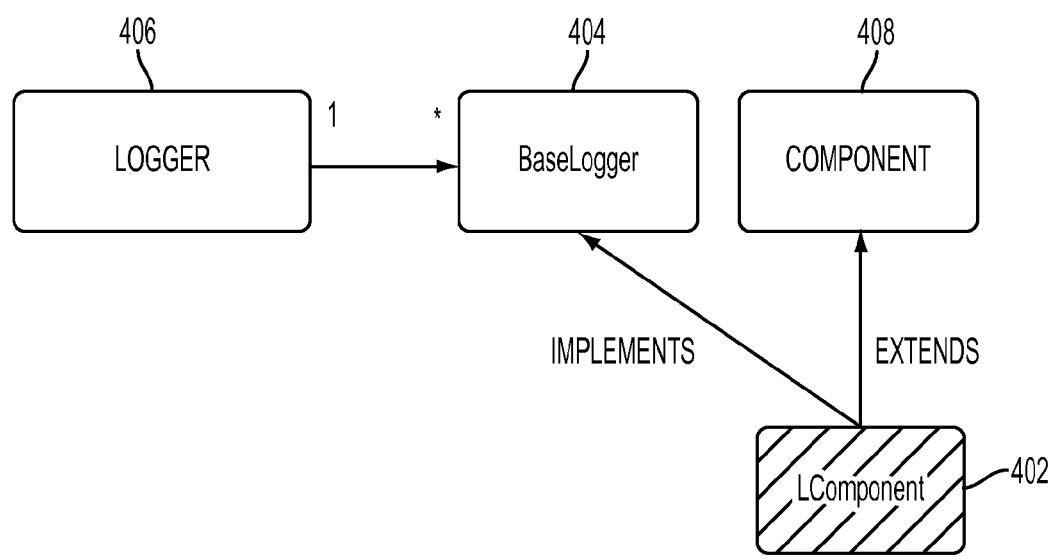
FIG. 4 illustrates loggable components in one embodiment of the present disclosure.

The instantiations of the objects may differ according to the runtime system and whether the runtime system supports final objects. In one embodiment of the present disclosure, the loggable objects can be instances of a subclass of the original object's class. In one aspect, subclasses differentiate logged objects from objects of the same class which are not logged. FIG. 4 illustrates examples of loggable components in one embodiment of the present disclosure. In one aspect, a loggable component 402 may be a "mixin" class that implements the interface 404 recognized by the Logger 406 and overrides the base component type to provide hooks to capture the attributes and events particular to the component 406 in question.

In one aspect, the implementers of the loggable subclasses know which of the two techniques to apply for creating a loggable version. For example, if one needs to log only the commonly used components, such as textboxes, network activity, user interface button elements, etc., then the loggable components can be implemented before or after the application is implemented. If there are application specific classes a user wants to log, then the signature of the class should be known beforehand, so that the loggable versions may be created. In one embodiment of the present disclosure, the implementation of the class need not be known; rather, the signature of the class (its name, and its member functions) may suffice in order to create a loggable version of the class.

In one embodiment of the present disclosure, the loggable library may be added even after the implementation of the application is finished. For instance, consider an example scenario in which an institution has outsourced its mobile application a year ago, and now wants to perform usage analytics on the application that its customers are already using. The institution may link the loggable library with the existing application and tell the users to use the new loggable application, which may look and behave exactly like the original application, but has the ability to log.

Further, the loggable component library may be an add-on feature separate from an application component; different implementer or parties may implement the loggable component library than those who implement the original application. For instance, those who write the original application and those who write the loggable components can be different, and they do not need to coordinate with one another. Consider, for example, that the institution has hired a company that has an expertise in creating mobile applications last year, and now the institution has deployed the mobile application for customers' uses. If the mobile application uses mostly the default library components for the mobile platform, then the institution may purchase a logging library which implements mechanism for default platform components, and add the loggable library to the mobile application. In another aspect, the institution may have its own programming workforce or another party different from the company it hired to write the mobile application, write or implement a logging library instrumented according to the methodologies described herein.

Figure 5:
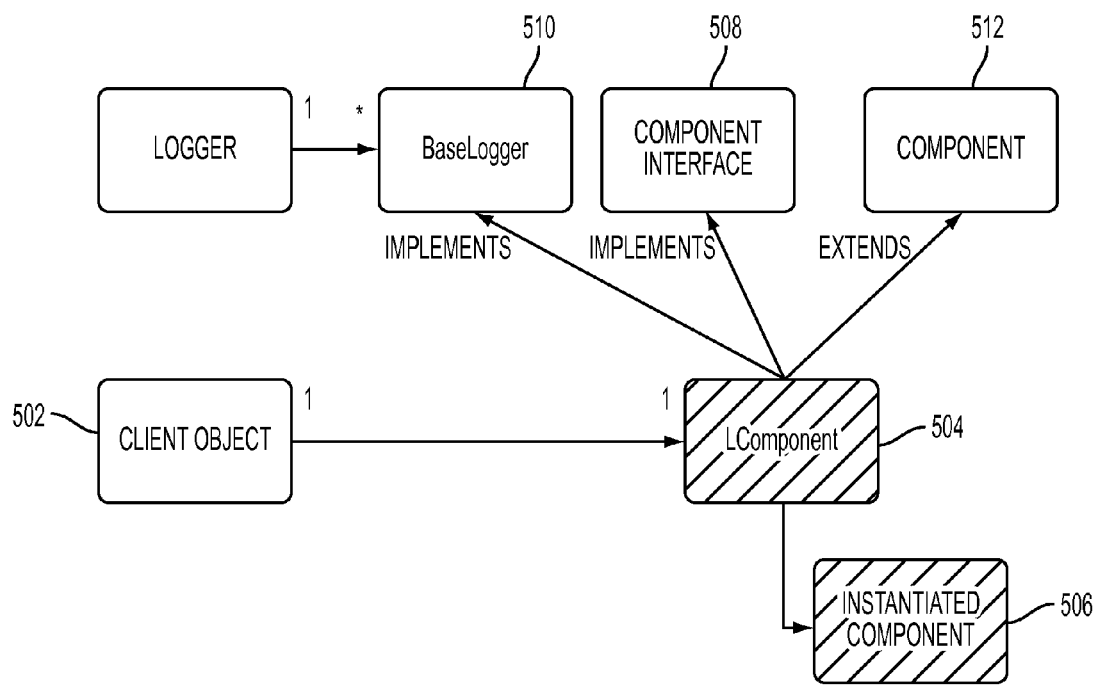
FIG. 5 illustrates wrapping final classes that provide component interface "callbacks" in one embodiment of the present disclosure.

FIG. 5 illustrates wrapping final classes that provide component interface "callbacks" in one embodiment of the present disclosure. If an object 502 to be logged is an instance of a final class, for instance, those that should not be overridden or modified, the loggable object 504 is an instance 506 of a wrapper, which contains an instance of the original class. For instance, the object 502 includes a member function has the instruction to instantiate the component that needs to be called; for example, the object 502 shown may be from a user interface (UI) class that creates one or more desired UI components. An example of the UI component may be a button element. The instrumentation methodology of the present disclosure in one embodiment presents the UI class object 502 as an object of loggable component class (LComponent) 504 rather than the normal component class 512. Depending on the runtime dispatch utilities, the wrapper class might need to imitate the method signatures exposed by the original object. In some languages, such as objective-c, this is not needed and the method calls can be passed to the original object without having to imitate the method signatures using runtime library callbacks. Classes that provide component interface "callbacks" 508 can be wrapped. A logging component 506 that implements a base logger 516 and one or more original component's interfaces, and extends the original component 512 may be instantiated in place of the original 512.

Once the loggable versions of the objects are instantiated, these objects are ready to log the activities according to the configuration. Once the log data is created, the loggable object should behave like the original object would behave. In one aspect, the implementation of this imitation may depend on whether the loggable object is a subclass of the original object's class or is a wrapper.

Figure 6:
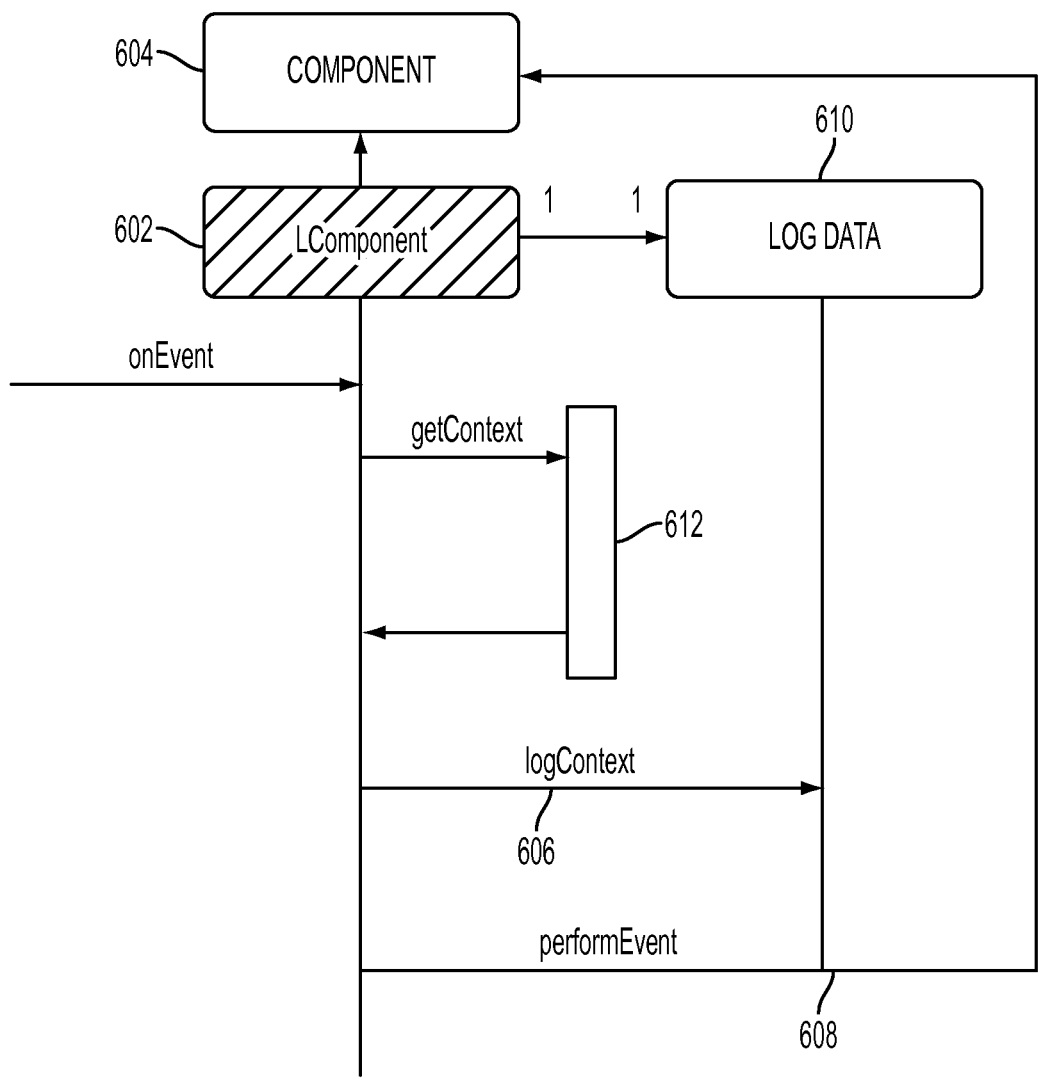
FIG. 6 illustrates a flow of how profiling may be achieved by subclassing in one embodiment of the present disclosure.

FIG. 6 illustrates a flow of how profiling may be achieved by subclassing in one embodiment of the present disclosure. If a loggable object 602 is a subclass of an original object's class 604, when a logging component's event handler is called at 612, a log 610 is written at 606 and an event is dispatched to its parent for further event processing at 608. This allows for other event handlers associated with the component to be fired or invoked as usual. Briefly, an event handler is a member function of an object that is known to other objects, for example, through protocol conventions or through registering callbacks, to call when the object needs to communicate an event, such as a network activity, or the finish of a computation. For example, if the logging component is a plugin, the plugin manager has a list of member functions that it can call on the plugin so that it can handle those events, or if the logging component is a webview, when the webview makes a request through the network library it registers a callback function that needs to be called when the response arrives according to a protocol.

Figure 7:
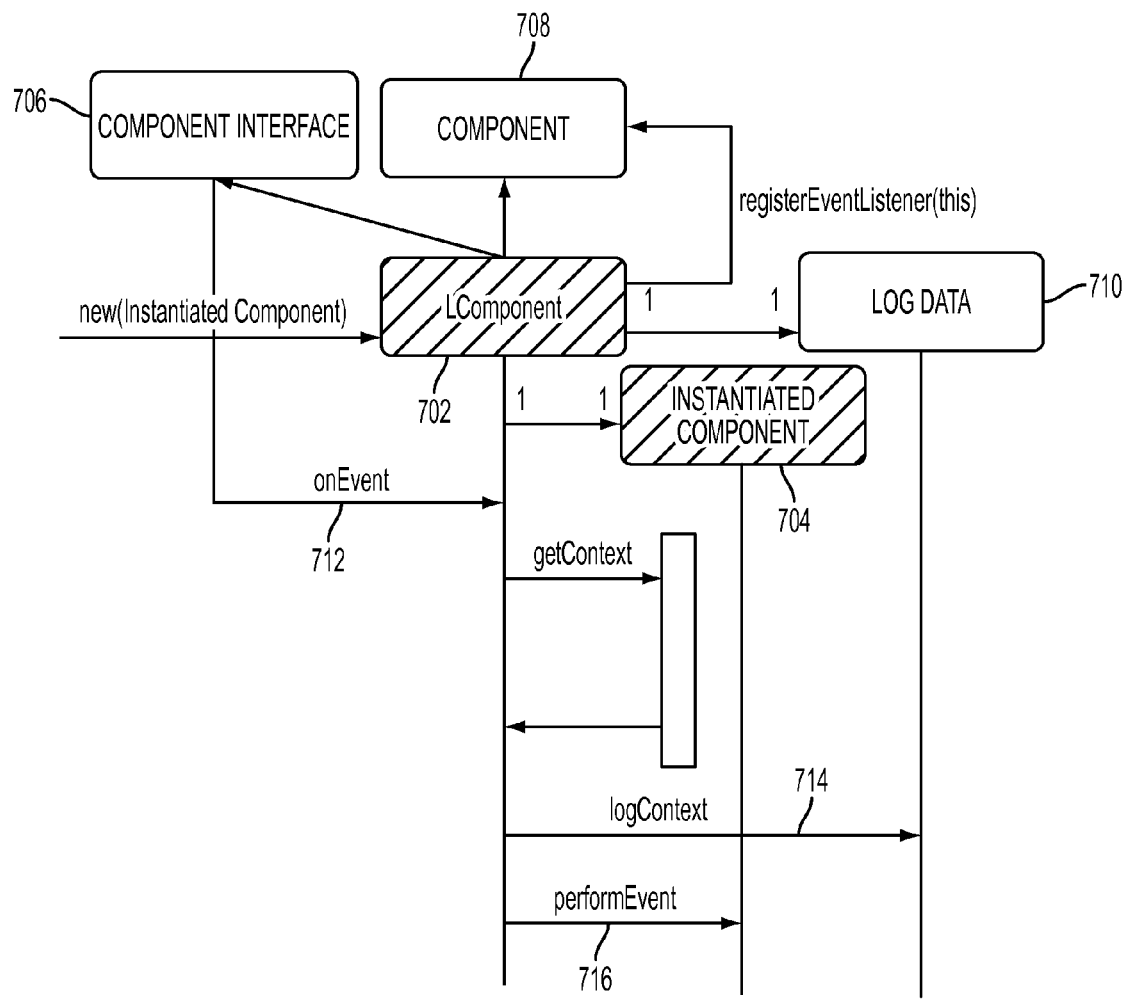
FIG. 7 illustrates a flow of how profiling may be achieved by wrapping objects in one embodiment of the present disclosure.

FIG. 7 illustrates a flow of how profiling may be achieved by wrapping objects that are declared as final, in languages that do not have runtime utilities to catch unsupported method calls. In languages that do not have runtime utilities to catch unsupported method calls, a logging component 702 in one embodiment of the present disclosure wraps an instantiated final class instance 704 which is passed in through the constructor. The logging component 702 thus encapsulates the functionality of the final class instance 704. The logging component 702 implements any callback interface 706 published by a component 708. When the component's callback interface is called 712, the log 710 is written 714 and the event is forwarded 716 to the instantiated component 704 for further event processing.

Figure 8:
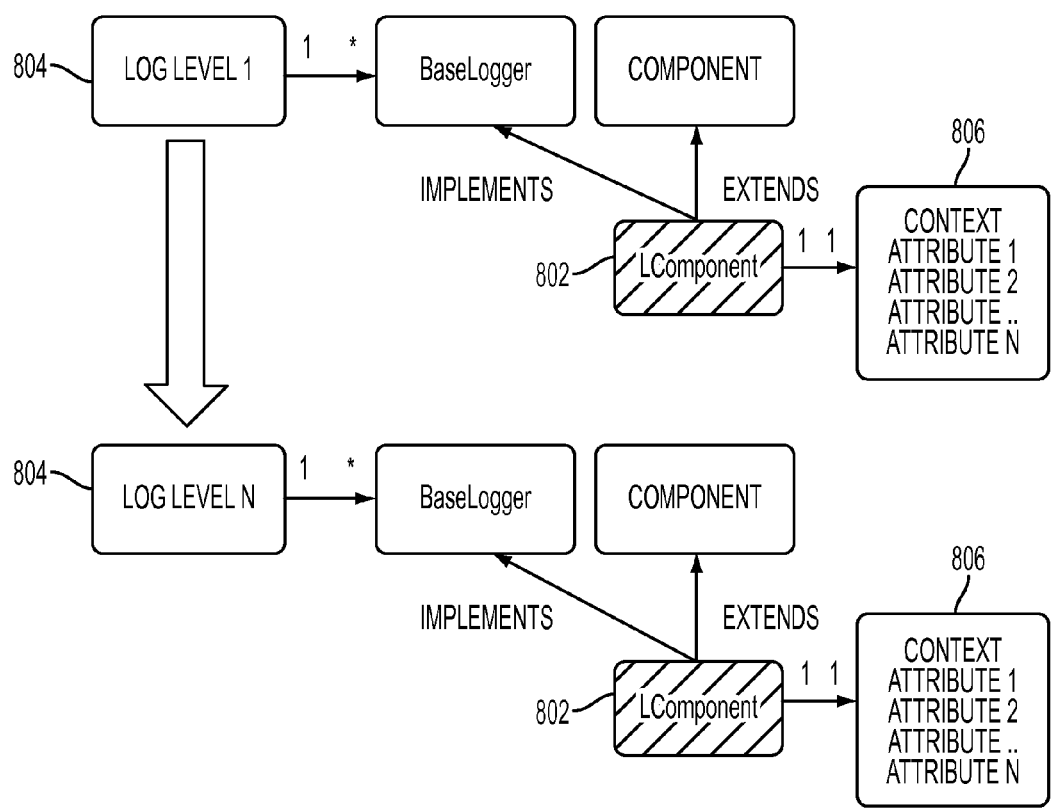
FIG. 8 illustrates logging granularity and context in one embodiment of the present disclosure.

FIG. 8 illustrates logging granularity and context in one embodiment of the present disclosure. Loggable components can be configured to create logs at different granularity levels, and the log information may include context in addition to method parameters. Context may include the values of objects and/or results produced and/or used by the running component. In one aspect, events trigger writes to the log. What is written may be about time and the type of event that triggered it. The writes may include other data, for example, context data. For instance, consider an example in which the instrumentation of the present disclosure is to provide logging of a physical activity application. The logging may be tied to an accelerometer event; what is logged may include the lap-time, heart-rate, location, etc., or other such context information. The context, in one embodiment of the present disclosure may include other information that may be logged in addition to the timestamp, the type of the event, and the event's arguments. In one embodiment of the present disclosure, the context may or may not extend beyond the boundaries of the object that is the subject of logging, for example, to contain information gleaned from other objects.

To provide flexibility in logging, each loggable object 802 may be individually configurable by log level 804 as well as context 806. In addition to logging parameters of the method calls, the component loggers have a configurable context 806 which specifies the selected attributes to record during a log.

Figure 9:
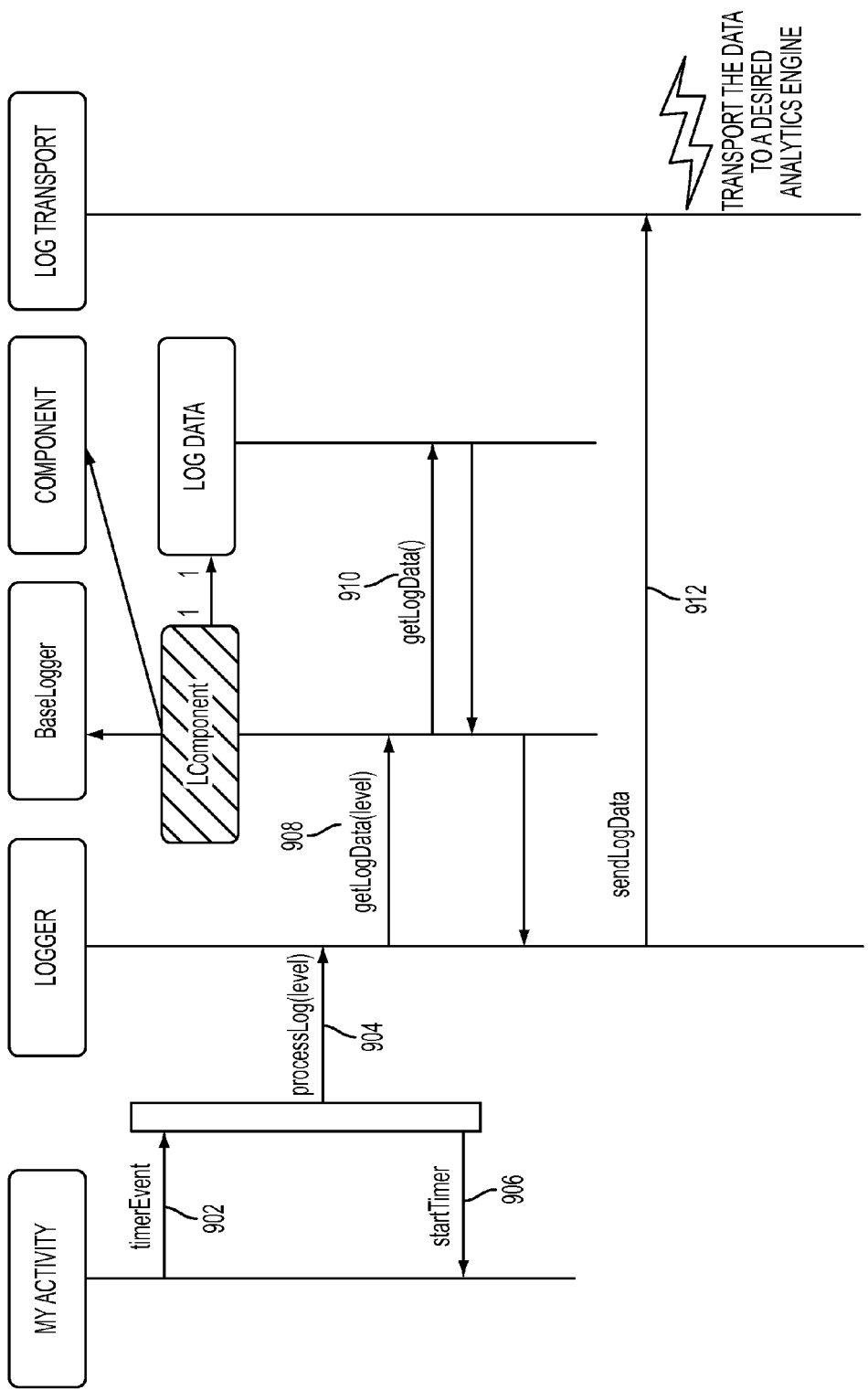
FIG. 9 illustrates an example flow of a logger sending log data to a logging server at configurable periods in one embodiment of the present disclosure.

The systems and methods of the present disclosure in one embodiment may also provide periodic updates to a logging server. For example, a logger can be set to periodically transport log data in batches via network to a logging server. FIG. 9 illustrates an example flow of a logger sending log data to a logging server at periods specified by the configuration in one embodiment of the present disclosure. At 902, a timer event is invoked. The timer event may occur periodically at the specified time interval. At 904, logging is processed at the specified level of granularity. At 906, the timer starts again for next timer event. At 908, log data is retrieved from a loggable object, which in turn gets the data from its data log at 910. At 912, the retrieved log data is transmitted to a log transport component that transports the data to a server, for example, via a network.

The tracking code in one embodiment of the present disclosure may be encapsulated in a component library that can be enabled or disabled at run-time or compile-time. This library in one embodiment need not have direct dependency on the application code, and this library should ease the burden on the programmer by encapsulating and logging all of the relevant attributes of the component in question. The systems and methods of the present disclosure may create a component library for capturing and potentially storing and/or transmitting user activity for the purpose, for example, of gathering analytics data. The component library may encapsulate the general set of inputs an application developer typically uses during development as well as system behavior that will determine the application state at run time. The components provide the ability to record and transmit usage data without disrupting the normal flow of the program. The library removes the need for adding tracking statements to the application code for capturing user and/or system activity, for example, for generating analytics data.

In one embodiment of the present disclosure, whether or not a function call or callback (event) is logged is given as a configuration directive by an analytics server, and these directives may include specifications about the granularity of information about the event and the objects involved as well as side information (context) to be collected. The directives may also include logic about which parts of the logging data is to be sent back to the analytics server, for example, and depending on the quality of network connection as well as power and cost considerations.

In one embodiment of the present disclosure, the systems and methods may allow for instructing a specific instance of the application, even for applications that are not of client-server paradigm. Moreover, since the logs may include information about the callbacks (from sensors, and peripherals such as network and user input) as well as the context, the systems and methods may be able to re-enact the application state even without having access to the server state, for instance, when the application accesses a multitude of backend services and client-side sensors. For instance, considering an application as a black box in steady state, sensors may be the input points where the internal state of the application can be effected. Sensors may include one or more components interacting with the system clock, system events, network, accelerometer, compass, UI, notifications, and/or others. Re-enacting the application state may include feeding data from the logs that were gathered from a previous run of the application as input to the components of the application that interact with those sensors.

The systems and methods of the present disclosure in one embodiment may enable logging of all application events such as function calls and callbacks from sensors, peripherals (e.g., network, global positioning systems (GPS)), and input devices. Interesting events may be captured that occur before an application reaches a specific state, and/or cause the application to come to a specific state. A capability of capturing whole or a portion of the application state may be also enabled.

As will be appreciated by one skilled in the art, aspects of the present invention may be embodied as a system, method or computer program product. Accordingly, aspects of the present invention may take the form of an entirely hardware embodiment, or an embodiment combining software (e.g., firmware, resident software, micro-code, etc.) and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of automatic application logging, comprising:
    receiving a directive for logging data associated with an application;
    modifying one or more runtime objects of an instance of the application running on a hardware processor according to the directive to collect the data, wherein individual instances of the same application running on the hardware processor are enabled to switch logging on and off, the modifying further comprising replacing the one or more runtime objects with another one or more runtime objects from a loggable component library that interacts with a runtime control, said another one or more runtime objects operable to behave like the one or more runtime objects and operable to log the data and send log data to a logger at a requested granularity, the modifying further comprising changing runtime method bindings and changing details of the data logged associated with the one or more runtime objects at runtime; and
    collecting the data via the modified one or more runtime objects, the modified one or more runtime objects modified to log the data for the collecting,
    wherein a part of the data that are sent to a server over a network are adaptively specified by the server based on a quality of the network, power level and cost of the network,
    adjusting the one or more runtime objects specified by the server, and adjusting behavior of the instance of the application to improve the application performance, based on analyzing of the one or more runtime objects and the behavior of the instance of the application.

2. The method of claim 1, wherein the directive includes specific identification of said one or more runtime objects from which to collect the data.

3. The method of claim 1, wherein the directive includes types of data to collect and granularity level of the data to collect.

4. The method of claim 1, wherein the directive is received from the server over a network.

5. The method of claim 1, wherein the directive is received over the network during a runtime of the application.

6. The method of claim 1, further including sending the collected data to the server.

7. The method of claim 6, wherein the collected data is sent periodically at a defined interval.

8. The method of claim 7, wherein the directive includes the defined interval.

9. A system for automatic application logging, comprising:
    a hardware processor operable to run an application,
    the hardware processor further operable to receive a directive for logging data associated with the application, the hardware processor further operable to modify one or more runtime objects of an instance of the application running on the hardware processor according to the directive to collect the data, wherein individual instances of the same application running on the hardware processor are enabled to switch logging on and off, the hardware processor operable to modify the one or more runtime objects by replacing the one or more runtime objects with another one or more runtime objects from a loggable component library that interacts with a runtime control, said another one or more runtime objects operable to behave like the one or more runtime objects and operable to log the data and send log data to a logger at a requested granularity, the hardware processor operable to change runtime method bindings and change details of the data logged associated with the one or more runtime objects at runtime, the hardware processor further operable to collect the data via the modified one or more runtime objects, the modified one or more runtime objects modified to log the data for collecting, wherein a part of the data that are sent to a server over a network are adaptively specified by the server based on a quality of the network, power level and cost of the network, adjusting the one or more runtime objects specified by the server, and adjusting behavior of the instance of the application to improve the application performance, based on analyzing of the one or more runtime objects and the behavior of the instance of the application.

10. The system of claim 9, further including a loggable component library including one or more components implementing an interface and performing respective one or more functionalities of the one or more runtime objects, wherein the processor is operable to modify the one or more runtime objects by replacing the one or more runtime objects with said one or more library components.

11. The system of claim 9, wherein the directive includes specific identification of said one or more runtime objects from which to collect the data.

12. The system of claim 9, wherein the directive includes types of data to collect and granularity level of the data to collect.

13. The system of claim 9, wherein the directive is received from the server over the network.

14. The system of claim 9, wherein the directive is received over the network during a runtime of the application.

15. The system of claim 9, further wherein the processor is further operable to send the collected data to the server.

16. The system of claim 15, wherein the processor is further operable to send the collected data periodically at a defined interval.

17. The system of claim 16, wherein the directive includes the defined interval.

18. A non-transitory computer readable storage medium storing a program of instructions executable by a machine to perform a method of automatic application logging, comprising:

receiving a directive for logging data associated with an application;

modifying one or more runtime objects of an instance of the application running on a hardware processor according to the directive to collect the data, wherein individual instances of the same application running on the hardware processor are enabled to switch logging on and off, the modifying further comprising replacing the one or more runtime objects with another one or more runtime objects from a loggable component library that interacts with a runtime control, said another one or more runtime objects operable to behave like the one or more runtime objects and operable to log the data and send log data to a logger at a requested granularity, the modifying further comprising changing runtime method bindings and changing details of the data logged associated with the one or more runtime objects at runtime; and collecting the data via the modified one or more runtime objects, the modified one or more runtime objects modified to log the data for the collecting, wherein a part of the data that are sent to a server over a network are adaptively specified by the server based on a quality of the network, power level and cost of the network, adjusting the one or more runtime objects specified by the server, and adjusting behavior of the instance of the application to improve the application performance, based on analyzing of the one or more runtime objects and the behavior of the instance of the application.

19. The non-transitory computer readable storage medium of claim 18, wherein the directive includes specific identification of said one or more runtime objects from which to collect the data.

20. The non-transitory computer readable storage medium of claim 18, wherein the directive includes types of data to collect and granularity level of the data to collect.

21. The non-transitory computer readable storage medium of claim 18, wherein the directive is received from the server over the network.

22. The non-transitory computer readable storage medium of claim 18, wherein the directive is received over the network during a runtime of the application.

23. The non-transitory computer readable storage medium of claim 18, further including sending the collected data to the server.

24. The non-transitory computer readable storage medium of claim 23, wherein the collected data is sent periodically at a defined interval.

25. The non-transitory computer readable storage medium of claim 24, wherein the directive includes the defined interval.

* * * * *